United States Patent
Morse et al.

(10) Patent No.: US 6,189,413 B1
(45) Date of Patent: Feb. 20, 2001

(54) CAPTIVE MOLDING WITH DISSIMILAR MATERIAL INSERT

(75) Inventors: David M. Morse, Waterford; Rajendra G. Kumashi, Clarkston, both of MI (US)

(73) Assignee: American Axle & Manufacturing, Inc., Detroit, MI (US)

(*) Notice: Under 35 U.S.C. 154(b), the term of this patent shall be extended for 0 days.

(21) Appl. No.: 09/351,612

(22) Filed: Jul. 12, 1999

(51) Int. Cl.[7] ................................................. F16H 57/02
(52) U.S. Cl. ................................................................ 74/607
(58) Field of Search ................................ 74/606 R, 607

(56) References Cited

U.S. PATENT DOCUMENTS

| | | |
|---|---|---|
| 3,726,154 | 4/1973 | Diessner . |
| 3,745,854 | 7/1973 | Haag et al. . |
| 4,008,747 | 2/1977 | Devers et al. . |
| 5,495,885 | 3/1996 | Fowlkes et al. . |
| 5,660,156 | 8/1997 | Whitacre et al. . |
| 5,678,298 | 10/1997 | Colvin et al. . |
| 5,713,247 | 2/1998 | Skelton et al. . |
| 5,730,199 | 3/1998 | Shimmell . |

Primary Examiner—Dirk Wright
(74) Attorney, Agent, or Firm—Harness, Dickey & Pierce, P.L.C.

(57) ABSTRACT

An improved housing, particularly one for an automotive differential assembly, is provided. The housing has a cast portion formed from a first material and a preformed insert member formed from a second material which is cast into the cast portion. The insert member is strategically placed in an area of the housing to selectively enhance or alter the properties of the housing at that location. The insert member may be encased in a wall of the cast portion or may extend partially through a wall of cast portion depending upon the characteristics which are being enhanced or altered. The properties which may be enhanced or altered include, for example the strength, electric or thermal conductivity, magnetic potential, chemical compatibility or the coefficient of friction.

20 Claims, 2 Drawing Sheets

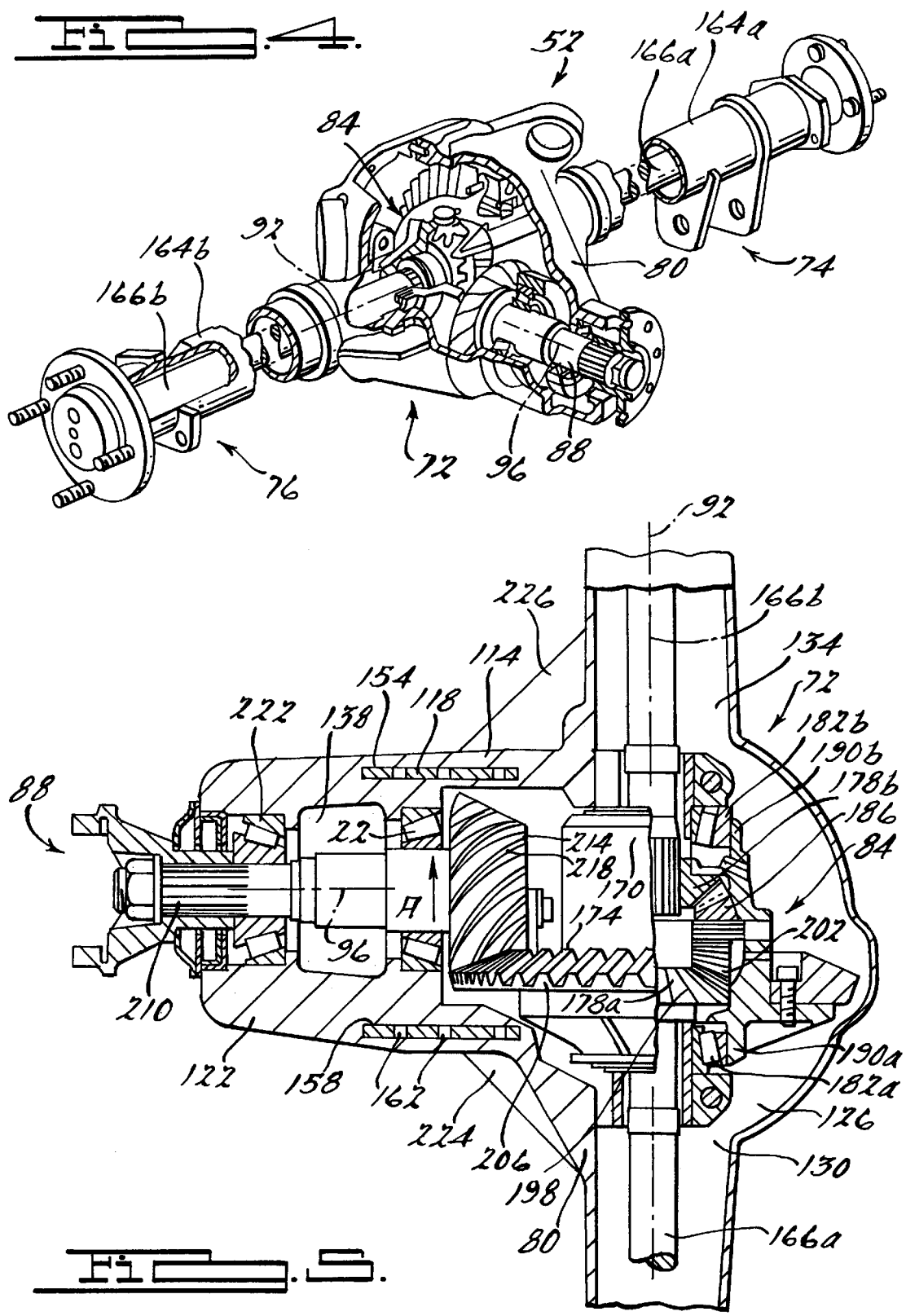

CAPTIVE MOLDING WITH DISSIMILAR MATERIAL INSERT

BACKGROUND OF THE INVENTION

1. Technical Field

The present invention relates generally to cast fabrications and more particularly to a cast fabrication having a cast portion and an insert of a material dissimilar to that of the cast portion.

2. Discussion

The design criteria for many types of housings typically includes considerations for the strength as well as the overall weight of the housing. This is particularly true for housings designed for use in highway vehicles, such as automobiles and trucks. One such component employed by such vehicles is a differential housing which supports the axles and drive shaft of a vehicle. Conventionally, differential housings have been formed out of lightweight materials, such as aluminum, to reconcile the competing design criteria of strength and weight.

While this strategy has provided satisfactory results with the engine and drive train combinations known in the art, the modern trend of vehicle manufacturers is toward vehicles having more power and torque. In some instances, conventional differential housings have not been satisfactorily integrated into such new vehicles with sufficient durability and failures have been noted in high-stress areas, primarily in the area where the drive shaft is supported for rotation within the differential housing. Attempts to improve the durability of the prior art differential housings have included various measures ranging from the fabrication of the differential housing from different materials having improved load carrying characteristics to the complete redesign of the axle system. Neither solution, however, has proven to be entirely satisfactory.

The use of a different material, such as cast iron, for example, entails not only a substantial weight penalty, but also substantial increases in the fabrication piece costs due to increased variability in the casting processes where the aluminum differential housing had been die cast. Additionally, conversion to a different material may necessitate the purchase of new equipment designed specifically to machine the new material. Examples of such equipment could range from new spindles, feed screws and tool resharpening equipment, to new machine tools designed to accommodate the specific characteristics of the material to be machined. In addition to being extremely costly, this approach may not be implementable in a given facility due to floor space limitations where production of conventional differential housings is still required.

The second alternative, redesigning the complete axle system, is also extremely costly, typically requiring vast resources to design, model and test the new axle system. Furthermore, the final design of many components is based on criteria established by "concurrent engineering" groups which utilize input from several disciplines, such as those associated with the casting, machining, assembly and servicing of the axle system. This additional criteria permits the component to be fabricated and serviced in a reliable and cost-effective manner. While such "concurrent engineering" efforts generally produce high quality, robust components, it is frequently difficult and costly to accommodate even the key fabrication and servicing concerns where the component is subjected to loads generating high stresses.

SUMMARY OF THE INVENTION

It is therefore one object of the present invention to provide an improved housing fabricated from two dissimilar materials.

It is a more specific object of the present invention to provide an improved housing which selectively employs an insert member of a material dissimilar to the primary material from which the housing is formed to provide the housing with one or more enhanced properties in a predetermined area.

An improved housing, particularly one for an automotive differential assembly, is provided. The housing of the present invention includes a cast portion formed from a first material and a preformed insert member formed from a second material which is cast into the cast portion. The insert member is strategically placed in an area of the housing to selectively enhance or alter the properties of the housing at that point. The insert member may be encased in a wall of the cast portion or may extend partially through a wall of cast portion depending upon the characteristics which are being enhanced or altered. The properties which may be enhanced or altered include, for example the strength, electric or thermal conductivity, magnetic potential, chemical compatibility or the coefficient of friction.

Additional advantages and features of the present invention will become apparent from the subsequent description and the appended claims, taken in conjunction with the accompanying drawings.

BRIEF DESCRIPTION OF THE DRAWINGS

FIG. 4 is a cut-away perspective view of the differential housing shown in FIG. 3; and FIG. 5 is a section view of a portion of the differential housing shown in FIG. 3.

DETAILED DESCRIPTION OF THE PREFERRED EMBODIMENT

Figure 1:
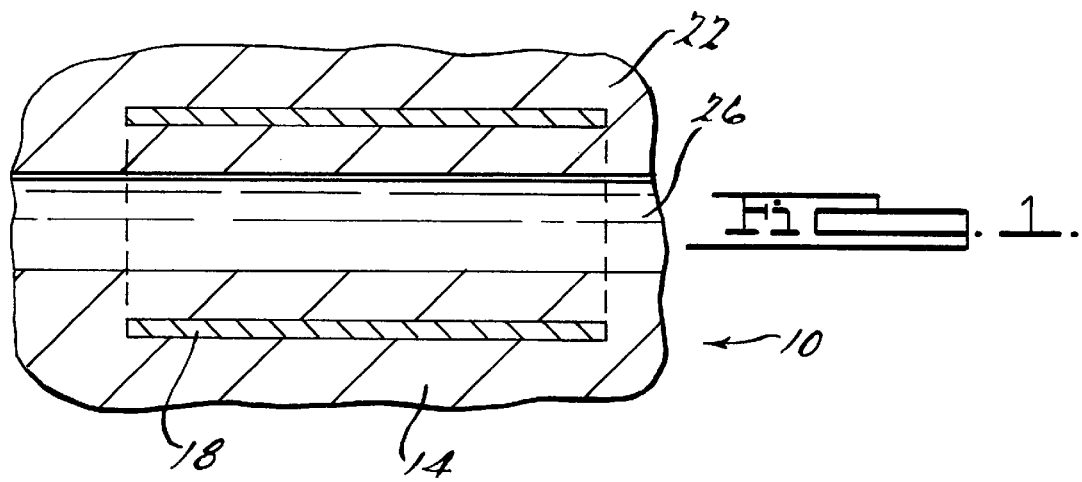
FIG. 1 is a cross-sectional view of an exemplary housing constructed according to a preferred embodiment of the present invention.

Referring to FIG. 1, the housing of the present invention is generally indicated by reference numeral 10. Housing 10 includes a cast portion 14 and an insert member 18. Cast portion 14 is formed from a first material having a first set of material properties. Insert member 18 is formed from a second material having a second set of material properties.

The first material is selected based upon the first set of material properties and a plurality of design criteria which frequently include considerations for the weight, strength, cost and processability (i.e., the ease with which the material is cast, machined and finished). The second material is selected based on the second set of material properties and its ability to compliment the properties of the first material to completely satisfy the plurality of design criteria. Note, too, that considerations for the shape and size of insert member 18 are also key to the fulfillment of the design criteria and as such, the scope of the present invention is not limited to an insert of any given size or shape. Accordingly, the present invention is not limited to an insert member 18 having a generally tubular shape as shown in FIG. 1, but also includes other structural shapes which are tailored to meet the plurality of design criteria for a given application. Furthermore, the second material may contribute any number of properties to housing 10, including tensile strength, sheer strength, electric or thermal conductivity, magnetic potential, chemical resistance or even the coefficient of friction.

Housing 10 is formed in a suitable casting process, such as die casting, investment casting (including lost wax and lost foam), and sand casting. Insert member 18 is preformed and positioned in a mold cavity. The first material is then heated to a molten state and introduced into the mold cavity to at least partially encase insert member 18 into a wall 22 of cast portion 14.

As shown in FIG. 1, insert member 18 may be fully encased in wall 22 to permit, for example, an aperture 26 in housing 10 to be formed in a conventional manner (e.g., coring, drilling, reaming, boring) without the use of special tooling including tool bits and equipment which may otherwise be necessary if insert member 18 extended through wall 22 into aperture 26. In this example, the first material is an aluminum alloy and second material is a steel alloy. The aluminum alloy has good processability characteristics, modest strength and enables housing 10 to be fabricated in a relatively light-weight manner. The steel alloy provides housing 10 with increased strength in an area proximate its location.

Figure 2:
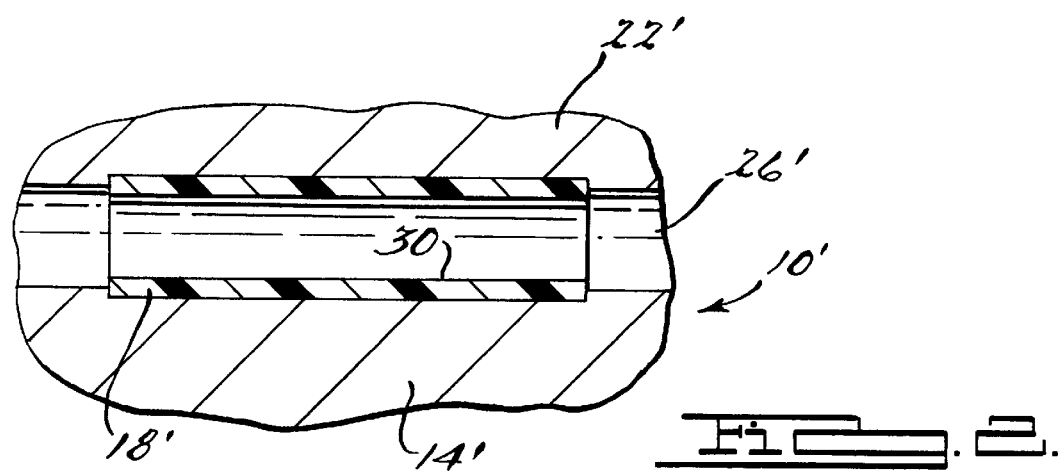
FIG. 2 is a cross-sectional view of an exemplary housing constructed according to an alternate embodiment of the present invention.

Alternatively, as shown in FIG. 2, insert member 18' maybe partially encased in wall 22' of cast portion 14' to permit the second material which forms insert member 18' to extend into aperture 26' in housing 10'. Construction of housing 10' in this manner incorporates the second set of material properties into a surface 30 of aperture 26'. In this example, the first material comprising cast portion 14' is an aluminum alloy and the second material comprising insert member 18' is a plastic material, such as nitrile. The nitrile material provides surface 30 with a reduced coefficient of friction relative to that provided by the aluminum alloy and permits a journal-style bearing to be incorporated into housing 10' during the casting process.

Figure 3:
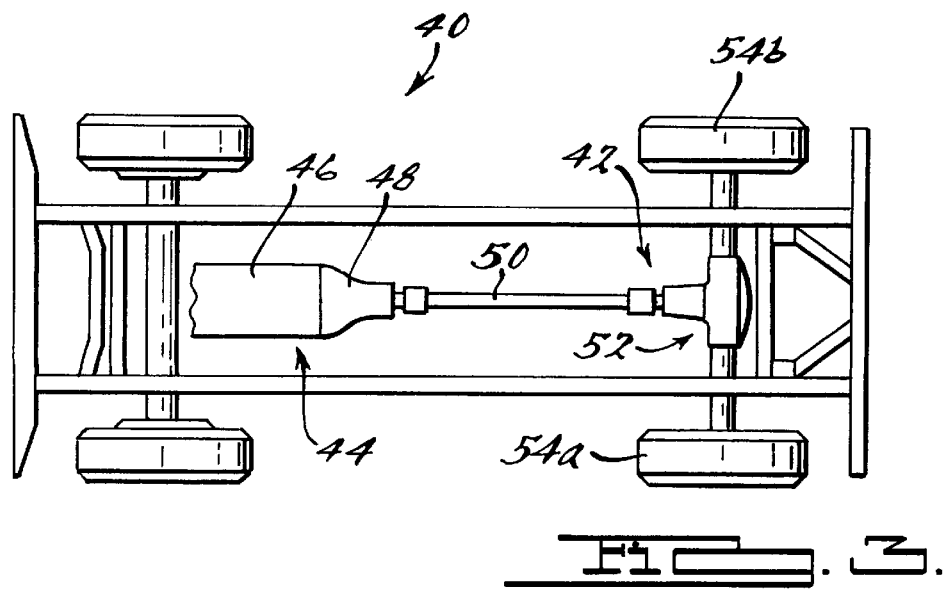
FIG. 3 is a functional illustration of a motor vehicle equipped with a differential housing constructed in accordance with the teachings of the present invention.

A more specific application of the present invention is illustrated in FIGS. 3 through 5. With reference to FIG. 3, a vehicle 40 is schematically shown which is suited for use with the present invention. Vehicle 40 includes a driveline 42 drivable via a connection to a powertrain 44. Powertrain 44 includes an engine 46 and a transmission 48. Driveline 42 includes a driveshaft 50, a rear axle 52 and a plurality of wheels 54. Engine 46 is mounted in an in-line or longitudinal orientation along the long axis of vehicle 40 and its output is selectively coupled via a conventional clutch to the input of transmission 48 to transmit drive torque therebetween. The input of transmission 48 is commonly aligned with the output of engine 46 for rotation about a rotary axis. Transmission 48 also includes an output and a gear reduction unit. The gear reduction unit is operable for coupling the transmission input to the transmission output at a predetermined gear speed ratio. Driveshaft 50 is coupled for rotation with the output of transmission 48. Drive torque is transmitted through driveshaft 50 to rear axle 52 where it is selectively apportioned in a predetermined manner to the right and left rear wheels 54a and 54b.

Referring now to FIGS. 4 and 5, rear axle 52 is shown to include a differential assembly 72, a left axle shaft assembly 74 and a right axle shaft assembly 76. Differential assembly 72 includes a housing 80, a differential unit 84 and an input shaft assembly 88. Housing 80 supports differential unit 84 for rotation about a first axis 92 and further supports input shaft assembly 88 for rotation about a second axis 96 that is perpendicular to first axis 92.

Housing 80 is initially formed in a suitable casting process such as die casting, investment casting (lost wax or lost foam) or sand casting, and thereafter machined as required. Housing 80 includes a cast portion 114 and an insert member 118. Cast portion 114 includes a wall member 122 defining a central cavity 126 having a left axle aperture 130, a right axle aperture 134, and an input shaft aperture 138. Cast portion 114 is formed from a first material, such as an aluminum alloy, to provide housing 80 with modest strength and a relatively low mass.

Insert member 118 is preformed in a desired structural shape from a second material, such as a steel alloy, to selectively strengthen a portion of housing 80. Insert member 118 is generally shaped in the form of a hollow cylinder and includes an exterior surface 154, an interior surface 158 and preferably, a plurality of retaining apertures 162 which extend at least partially through one or both of the exterior and interior surfaces 154 and 158, respectively.

Cast portion 114 is formed around insert member 118 so as to at least partially encase or encapsulate insert member 118 in wall member 122. During the casting process, while the first material is in a molten state, a portion of the first material flows into the plurality of retaining apertures 162 and mechanically fixes insert member 118 to wall member 122 when the second material solidifies. Preferably, insert member 118 and wall member 122 are sized in a manner which permits input shaft aperture 138 to be formed in a conventional manner, such as coring, drilling, reaming and boring, without the use of special processes, tooling or equipment as compared to a housing which does not include insert member 118.

Left axle shaft assembly 74 includes a first axle tube 164a fixed to axle aperture 130 of housing 80 and a first axle half-shaft 166a supported for rotation in first axle tube 164a about first axis 92. Similarly, right axle shaft assembly 76 includes a second axle tube 164b fixed to axle aperture 134 of housing 80 and which supports a second axle half-shaft 166b for rotation about first axis 92.

Differential unit 84 is disposed within central cavity 126 of housing 80. Differential unit 84 includes a case 170, a ring gear 174 fixed for rotation with case 170, and a gearset 176 disposed within case 170. Gearset 176 includes first and second side gears 178a and 178b and a plurality of differential pinions 186 rotatably supported on pinion shafts 188 mounted to case 170. Case 170 includes a pair of trunions 190a, 190b and a gear cavity 194. Bearing assemblies 182a, 182b are shown to support trunions 190a, 190b from housing 80 for rotation about first axis 92. First axle half-shaft 166a and second axle half-shaft 166b extend through left axle aperture 130 and right axle aperture 134, respectively, where they are coupled for rotation about first axis 92 with first and second side gears 178a and 178b, respectively. Case 170 is operable for supporting first and second side gears 178a and 178b for rotation within gear cavity 194 about first axis 92. Case 170 is also operable for supporting the plurality of differential pinions 186 for rotation within gear cavity 194 about one or more axes perpendicular to first axis 92. First and second side gears 178a and 178b each include a plurality of teeth 198 which meshingly engage teeth 202 of differential pinions 186. As noted, ring gear 174 is coupled for rotation with case 170 and includes beveled ring gear teeth 206.

Input shaft assembly 88 extends through input shaft aperture 138 where housing 80 supports it for rotation about second axis 96. Input shaft assembly 88 includes an input shaft 210, a pinion gear 214 having pinion teeth 218 meshingly engaging ring gear teeth 206 and bearing assemblies 222 and 224 which cooperate with housing 80 to rotatably support input shaft 210. Input shaft assembly 88 is coupled for rotation with driveshaft 50 and is operable for transmitting drive torque to differential unit 84. More specifically, drive torque received by input shaft 210 is transmitted by pinion teeth 218 to ring gear teeth 206 such that drive torque is distributed through the differential pinions 186 to first and second side gear 178a and 178b.

With specific reference to FIG. 5, a reaction force is created by the transfer of drive torque between pinion teeth 218 and ring gear teeth 206 which tends to push input shaft 210 toward housing 80 in the direction of arrow A. As such, the reaction force is transmitted through housing 80 in an area proximate bearing assembly 224 where it is ultimately transferred to insert member 118. The higher strength of insert member 118 relative to wall member 122 permits the reaction force to be absorbed by insert member 118 and/or transmitted to a different area of housing 80 adjacent to insert member 118, such as gussets 224 and 226, which minimizes stress in the housing 80 that results from the reaction force.

The encapsulation of insert member 118 has been shown molded or cast in-situ in one particular location. However, it will be appreciated that additional insert members can be used in other locations in housing 80 or, for that matter, in case 170 depending on the particular drivetrain application. Thus, while the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A housing for a differential assembly, said housing comprising:

a cast portion having a wall member, said wall member including an interior surface defining inwardly of said surface an interior aperture, said cast portion formed from a first material permitting manufacture of said cast portion as a casting, said wall member adapted for supporting a shaft for rotation within said interior aperture and receiving a reaction force in response thereto; and an insert member formed from a second material and at least partially embedded in said wall member outwardly of said interior surface, said insert member distributing said reaction force within said cast portion in a predetermined manner to increase the strength of said housing.

2. The housing of claim 1 wherein said first material is an aluminum material and said second material is a steel material.

3. The housing of claim 1 wherein said insert member is a generally tubular member.

4. The housing of claim 1 wherein said second material has a tensile strength greater than a tensile strength of said first material.

5. The housing of claim 1 wherein said insert member extends inwardly from said interior surface into said interior aperture.

6. The housing of claim 1 wherein said insert member is substantially completely embedded in said wall member outwardly of said interior surface.

7. The housing of claim 1 wherein said cast portion is formed in a casting process from the group of die casting, investment casting and sand casting.

8. A differential assembly for an automotive vehicle, said differential assembly comprising:

an shaft operable for transmitting drive torque;

a housing having a cast portion and an insert member, said a cast portion including a wall member with an interior surface defining inwardly of said surface an interior aperture, said wall member supporting said shaft for rotation within said interior aperture and receiving a reaction force in response thereto, said insert member formed from a second material and being at least partially embedded in said wall member outwardly of said interior surface, said insert member distributing said reaction force within said cast portion in a predetermined manner to increase the strength of said housing.

9. The differential assembly of claim 8 wherein said first material is an aluminum material and said second material is a steel material.

10. The differential assembly of claim 8 wherein said insert member is a generally tubular member.

11. The differential assembly of claim 8 wherein said second material has a tensile strength greater than a tensile strength of said first material.

12. The differential assembly of claim 8 wherein said insert member extends inwardly from said interior surface into said interior aperture.

13. The differential assembly of claim 8 wherein said insert member is substantially completely embedded in said wall member outwardly of said interior surface.

14. The differential assembly of claim 8 wherein said cast portion is formed in a casting process from the group of die casting, investment casting and sand casting.

15. A housing comprising:

a cast portion having a wall member, said wall member including an interior surface defining inwardly of said surface an interior aperture, said cast portion formed from a first material permitting manufacture of said cast portion as a casting; and an insert member formed from a second material and embedded in said wall member so as to extend inwardly from said interior surface into said interior aperture.

16. The housing of claim 15 wherein said first material is an aluminum material and said second material is a steel material.

17. The housing of claim 15 wherein said first material is an aluminum material and said second material is a nitrile material.

18. The housing of claim 15 wherein said second material has a coefficient of friction smaller than a coefficient of friction of said first material.

19. The housing of claim 15 wherein said insert member is a generally tubular member.

20. The housing of claim 15 wherein said cast portion is formed in a casting process from the group of die casting, investment casting and sand casting.

* * * * *